United States Patent [19]

Kooi

[11] Patent Number: 4,619,733

[45] Date of Patent: Oct. 28, 1986

[54] POLLUTION FREE PULPING PROCESS USING RECYCLED WASH EFFLUENT FROM MULTIPLE BLEACH STAGES TO REMOVE BLACK LIQUOR AND RECOVERING SODIUM HYDROXIDE FROM THE BLACK LIQUOR

[76] Inventor: Boon-Lam Kooi, 14429 Swallow Rue, Pierrefonds, Quebec H9H 1S6, Canada

[21] Appl. No.: 725,506

[22] Filed: Apr. 24, 1985

Related U.S. Application Data

[63] Continuation of Ser. No. 556,381, Nov. 30, 1983, abandoned.

[51] Int. Cl.⁴ .................. D21C 9/147; D21C 9/153; D21C 9/16
[52] U.S. Cl. .................................. 162/30.1; 162/37; 162/65; 162/78
[58] Field of Search .................... 162/19, 65, 30.1, 60, 162/30.11, 33, 37, 40, 78

[56] References Cited

U.S. PATENT DOCUMENTS

| | | | |
|---|---|---|---|
| 4,131,508 | 12/1978 | Laakso | 162/65 |
| 4,196,043 | 4/1980 | Singh | 162/65 |
| 4,372,812 | 2/1983 | Phillips et al. | 162/65 |

OTHER PUBLICATIONS

Andrews et al., "Oxygen Delignification and Bleaching of Soda-Anthraquinone Pulps", *TAPPI*, vol. 62, No. 6, Jun. 1979, p. 29.

Fujii et al., Oxygen Pulping of Hardwoods, *TAPPI*, vol. 61, No. 8, Aug. 1978, p. 37.

Soteland, "Bleaching of Chemical Pulps with Oxygen and Ozone", Pulp and Paper Magazine Canada, vol. 75, No. 4; Apr. 1974, p. 91.

*Primary Examiner*—Steve Alvo
*Attorney, Agent, or Firm*—Watson, Cole, Grindle & Watson

[57] ABSTRACT

A pollution free pulping process wherein a lignocellulosic material is subjected to various pulping and bleaching steps without the use of sulphur and chlorine. The system is a closed one thus minimizing energy and chemical requirements while permitting one to obtain a product having excellent physical properties.

3 Claims, 3 Drawing Figures

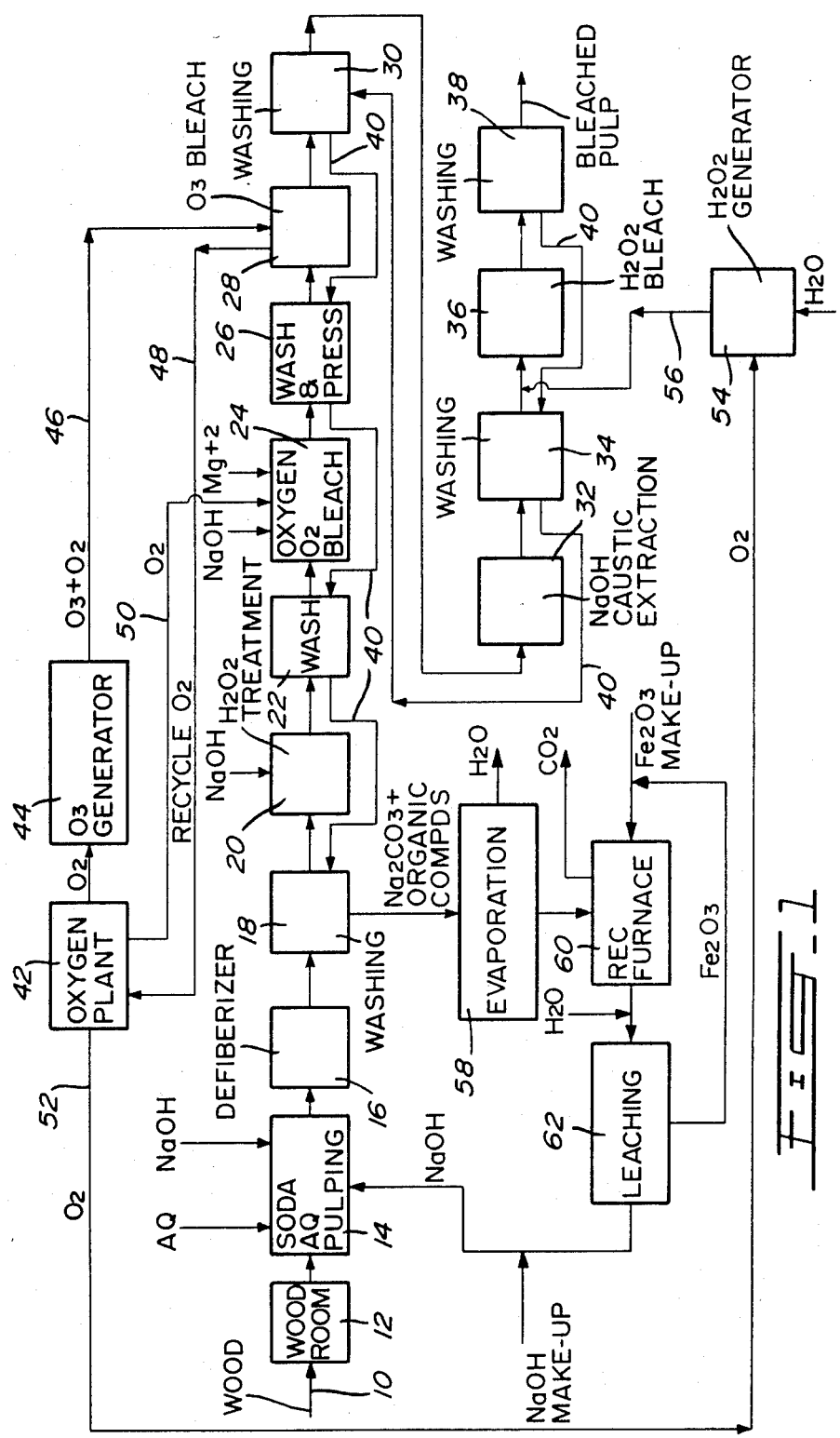

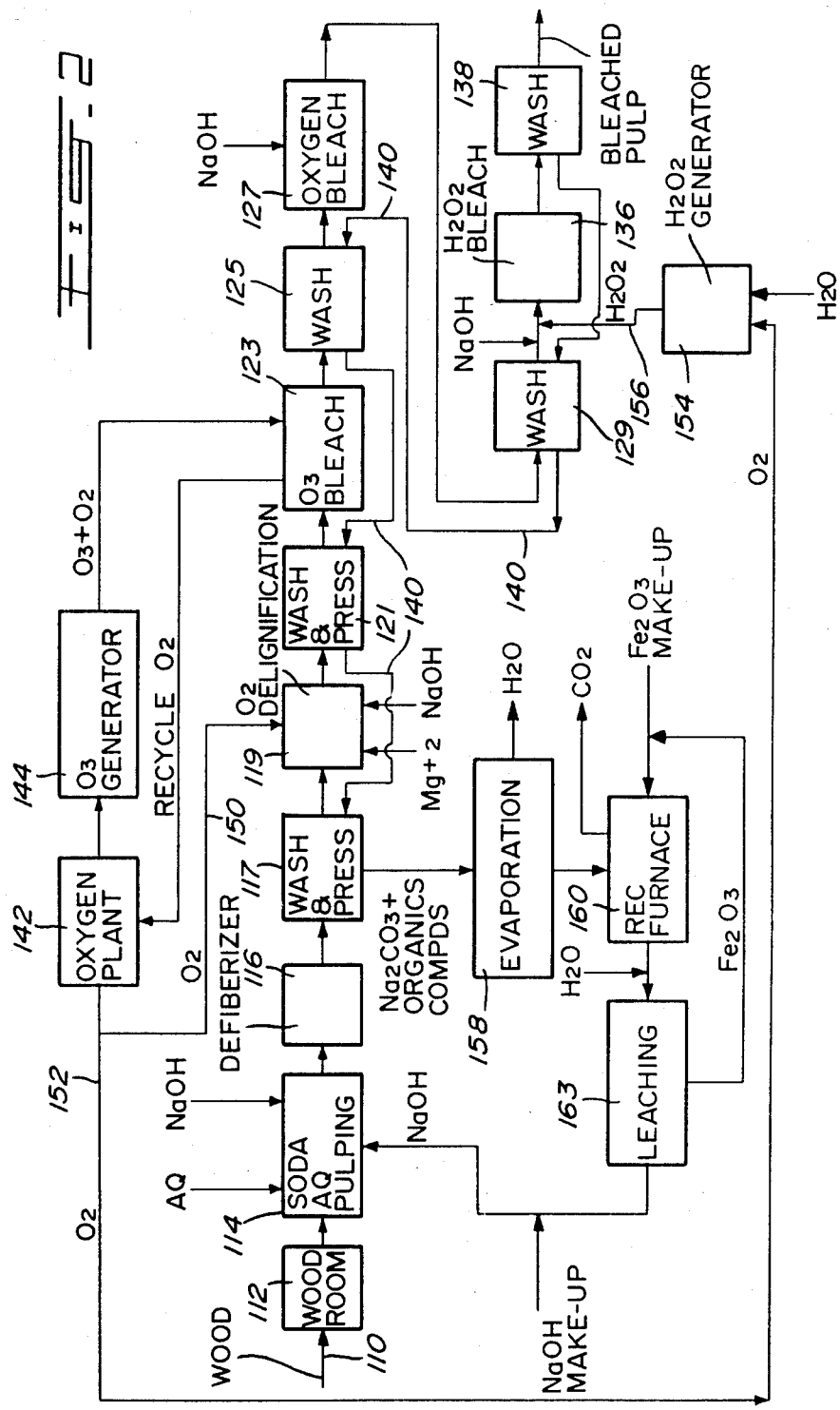

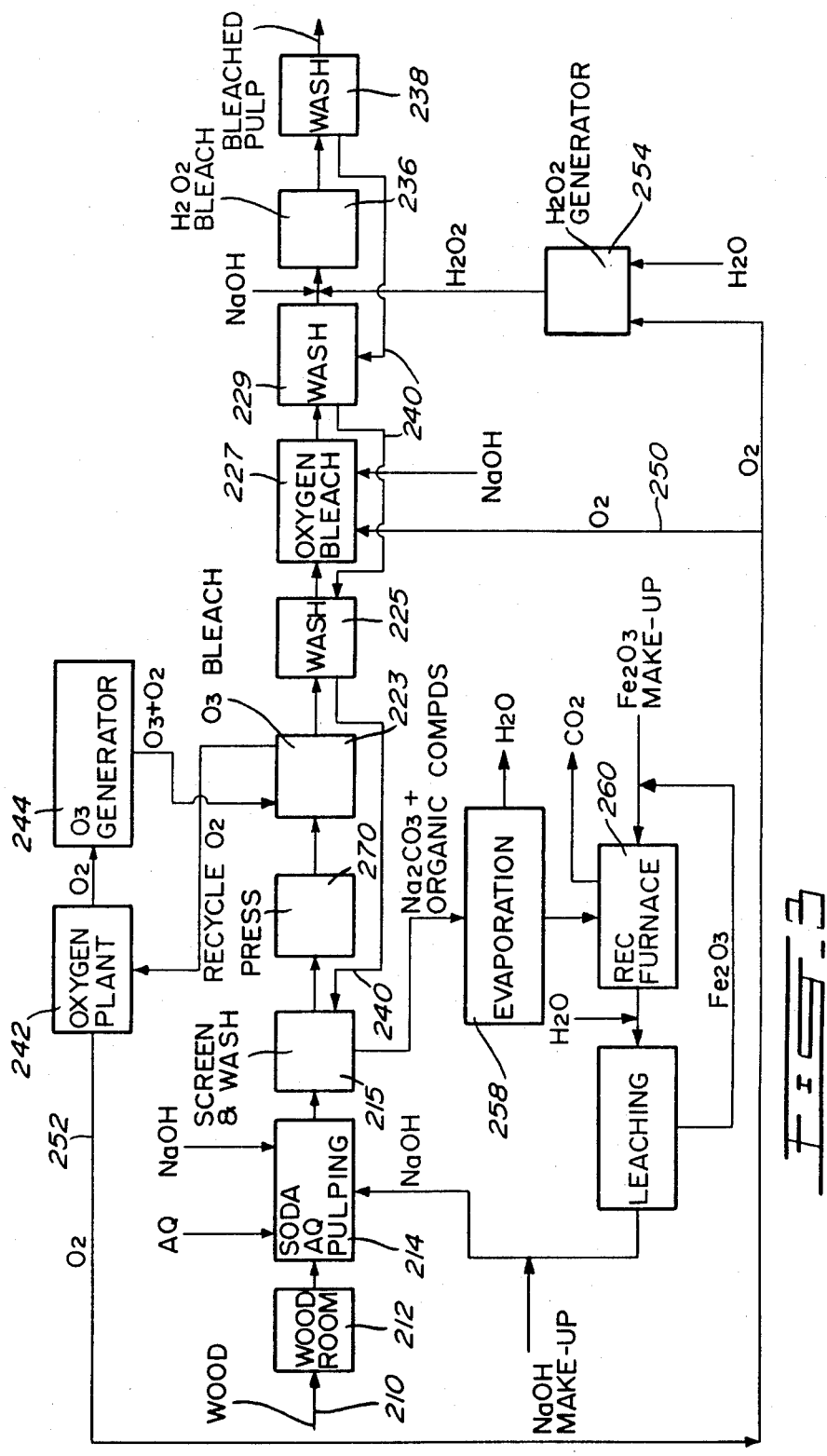

POLLUTION FREE PULPING PROCESS USING RECYCLED WASH EFFLUENT FROM MULTIPLE BLEACH STAGES TO REMOVE BLACK LIQUOR AND RECOVERING SODIUM HYDROXIDE FROM THE BLACK LIQUOR

This application is a continuation of application Ser. No. 556,381, filed Nov. 30, 1983 and now abandoned.

The present invention relates to pulping processes and particularly to pollution-free pulping processes and improvements thereto.

Several different pulping methods are known in the art; they are generally classified as refiner mechanical pulping, chemi-mechanical pulping, thermo-mechanical pulping and chemical pulping. The chemical pulping method includes many different processes such as the sulphite proces, bisulphite process, the neutral sulphite semichemical (NSSC) process, the soda process and the kraft process. Each of the processes is utilized for producing a specific type of a pulp for a given end product; each process has its advantages and disadvantages. Thus, the kraft process produces a high quality pulp which is of a relatively dark colour. The kraft process is a heavy chemical user and creates pollution problems.

It is an object of the present invention to provide a pulping process which substantially reduces or eliminates air and water pollution encountered in prior art processes.

It is a further object of the present invention to provide an improved pulping process eliminating the use of sulphur in the delignification of the lignocellulosic material and to eliminate chlorine containing chemicals in the bleaching steps.

It is a further object of the present invention to provide specific bleaching steps which eliminate conventional chlorine and chlorine containing compounds to produce fully bleached lignocellulosic pulp.

It is a further object of the present invention to provide improved pulping processes wherein pollution is substantially reduced or eliminated while optimizing the physical properties of the pulp in an energy efficient process.

The present invention is particularly suitable to the pulping of wood species as commonly practiced in the pulping industry—i.e. various softwoods and hardwoods. The improvements may also be practiced in connection with the pulping of other lignocellulosic materials such as bagasse, kenaf, bamboo, straw, rag esparto grass, etc.

The present invention is particularly directed to soda process for pulping; the improvements set forth herein, however, can easily be adapted for the conversion of existing chemical pulping processes such as kraft and bisulphite processes.

The invention may be practiced either using batch or continuous flow systems. As understood in the art, the major components of wood are the fibrous cellulosic portion and the non-fibrous lignin portion. For paper-making purposes, wood is tranformed into pulp by removing the undesirable non-fibrous lignin portion and utilizing the fibrous cellulosic portion. In the kraft process, sodium hydroxide and sodium sulphide were utilized in delignification of the wood. The pulping chemicals are commonly referred to as a "white liquor"; the sulphide in the white liquor is believed to accelerate the delignification. Occasionally, elementary sulphur is added to the white liquor to maintain the desired sulphidity. This sulphur, as will be discussed hereinbelow, is a factor in pollution problems encountered in the pulping field.

The delignification of wood is carried out according to a predetermined program which employs the H factor method. The H factor is the integrated area under a relative reaction rate versus time curve and has been used to express digesting or cooking time and temperature as a single variable. Regardless of any combinations of cooking times and temperatures cooking cycles which have equal H factors can be expected to produce pulp of equivalent yield or lignin content. Different wood species require different cooking conditions since hardwood typically contains 16–24% lignin while softwood contains 27–33% liqnin. A typical cooking condition in a kraft process is carried out at 100 psig at 330° F. with a cooking time varying between 2 to 3½ hours depending upon such variables as wood species, target lignin content or K numbers, liquor to wood ratio, chip moisture, percent active alkali charge, sulphidity, etc.

At the end of the cooking or digesting, the softened chip material is blown under pressure to an open blow tank; the force of ejection defiberizes the chip and breaks into fiber. At this stage, the pulp is generally a darkly coloured cellulose fibre commonly called "brown stock"; the dark colour is attributable to the lignin which has not been removed during digestion. The brown stock is then washed to remove any traces of cooking liquor and the brown stock is then sent to a paper-making process for makihg unbleached grades of paper or alternatively, sent to the bleach plant. The effluent from the washing operation plus the spent cooking liquor from the digesters is commonly referred to as black liquor; black liquor may either be partly recycled to the digester or subject to a chemical recovery process which includes black liquor evaporation, liquor burning, causticizing, lime burning and liquor preparation. Thus, the black liquor is normally evaporated to give a higher (60–70%) solid content, salt cake is added and then burnt in the recovery boiler. In the furnace, the organic compounds in the liquor generate heat and carbon dioxide which is absorbed by the predominantly alkaline residue to form sodium carbonate. The sulphur containing compounds undergo a series of reaction to produce hydrogen sulphide, sulphur dioxide and sodium sulphide. The sulphur containing compounds comprise a major source of air pollution.

The molten ash from the recovery unit, which mainly consists of sodium carbonate and sodium sulphide together with some impurities, are dissolved in water to form a "green liquor". This green liquor is then treated with suspension of slaked lime to convert the sodium carbonate to sodium hydroxide with the sodium sulphide remaining unchanged. This sodium hydroxide is further clarified and used in the cooking process. The precipitate of the causticizing process (calcium carbonate) is washed and is then thickened in the filter and subsequently burned in the lime kiln to produce calcium oxide. Occasionally, limestone or calcium carbonate is added to the lime kiln for make up purposes. This recovery process has some disadvantages including the generation of lime dregs which are not usable; the efficiency of the caustification is limited to approximately 85%, and the inactive sodium salt which is not converted to sodium hydroxide is circulated in the system thus increasing the chance of soda loss. The concentration of sodium hydroxide obtained is somewhat limited to the range of 15% thus the liquor to wood ratio in the digester is kept relatively high and more heating energy is required.

The present invention overcomes the pollution created by the use of sulphur compounds by delignifying with non-polluting materials. Preferably, the lignocellulosic material is delignified using sodium hydroxide and a catalytic reagent such as anthraquinone (AQ) followed by oxygen delignification or alternatively, by hydrogen peroxide delignification. This sequence of delignification produces a pulp which has high physical strength properties comparable to kraft pulp and the same final lignin level while eliminating sulphur in the pulping chemicals and the associated problems.

Pulp bleaching is a multi-stage process typically using bleaching chemicals such as chlorine, calcium hypochlorite, sodium hypochlorite, and chlorine dioxide. Although chlorine and chlorine-containing chemicals are known to be powerful bleaching agents, at the same time the pulping industry has been faced with numerous problems associated with the chlorine containing compounds. Thus, the chlorine compounds are hazardous to health and difficult to handle. Moreover, the compounds are corrosive to the pipeline and machinery and as such, the cost of construction has been high since stringent material specifications are required utilizing such materials as titanium, reinforced plastic (FRP) materials etc. Also, the effluent after the washing or chlorine extraction stage contained mainly chloro-lignin compounds which are extremely toxic and account for the major BOD loading in the discharge effluent.

Other bleaching steps including specific oxygen, ozone, and hydrogen peroxide steps have been proposed in the art. However only partial replacement of chlorine-containing compounds are carried out such as oxygen predelignification ahead of chlorine stage. Although the pollution problem associated with chlorine compound has been reduced, the polluting source still remains.

The present invention provides novel combinations of pulping and bleaching steps which overcome the problems encountered in the prior art and produce a high grade pulp.

Utilizing the non-chlorine bleaching sequence set forth hereinbelow, one is able to utilize complete counter-current washing in the multi-stage bleaching process by using the effluent from the last stage of the bleaching sequence for pulp washing in the preceding stage or step counter-current washing. The effluent from the final counter-current washing stage, which effluent is free of chloro-lignin compounds can be sent to a suitable recovery furnace for recovery of the sodium hydroxide. By utilizing the countercurrent washing at each bleaching stage, energy savings are effected by utilizing the heat available in the effluent. Moreover, the final effluent sent to the recovery furnace is free of chloride and thus prior art recovery furnace overloading problems are reduced. Also, the system permits a closed loop operation with no discharge to the sewer.

The recovery system will preferably use a direct alkali recovery system as is known in the art. This thus closes the loop in the chemical recovery cycle.

Having thus generally described the invention, reference will be made to the accompanying drawings illustrating embodiments thereof, in which:

FIG. 1 is a flow chart of a first embodiment of a pulping process;

FIG. 2 is a flow chart of a second embodiment of a pulping process; and

FIG. 3 is a flow chart of a third embodiment of a pulping process.

Referring to FIG. 1 in greater detail, wood as indicated by arrow 10 is forwarded to a wood room 12. The wood may be softwood, hardwood or some other lignocellulosic material. Subsequently, delignification is commenced in a digester 14 wherein sodium hydroxide and anthraquinone (AQ) are added and the lignocellulosic material is cooked under pulping conditions as set forth hereinbelow. Subsequently, the precooked pulp is sent to a defiberizer 16 to mechanically treat the chips into a softened pulp mass.

The pulp from defiberizer 16 is then subjected to a washing treatment 18. Following the washing, a hydrogen peroxide and sodium hydroxide treatment is carried out as indicated by reference numeral 20. From hydrogen peroxide treatment 20, the pulp is forwarded to washer 22 and then subsequently to an oxygen bleach treatment 24. At this point, a magnesium salt is added in a small quantity to serve as a prohibitor to carbohydrate degradation. Sodium hydroxide is also added.

Subsequent to oxygen bleaching 24, the pulp is sent to washer 26 and is then subjected to an ozone bleach 28. A further washing step 30 follows before the pulp enters a caustic extraction stage identified by reference numeral 32. A further washing step 34 occurs and a final bleaching is carried out utilizing hydrogen peroxide bleaching 36 the pulp is then subjected to a final wash 38.

As indicated by line 40, the effluent from each washing stage or step is utilized in a countercurrent manner as wash water in the preceding washing stage. As a result, there is considerable savings in energy because the heat value in the washing effluent can be utilized and little or no fresh water is needed. This is not possible in a conventional bleach plant using chlorine and chlorine-containing bleaching chemicals. As will be appreciated by those skilled in the art, the effluent from any washing or wash and press step may be recycled not only in the immediately preceding wash step, but may go to any preceding wash treatment.

As may be seen from FIG. 1, the system will include an oxygen generating plant 42 and an ozone generator 44. From the flow diagram oxygen from plant 42 will flow to generator 44. Through line 46, ozone and oxygen will flow to the ozone bleaching stage 28. Oxygen from ozone bleaching step 28 is recycled via line 48 to oxygen plant 42. Oxygen plant 42 also supplies through line 50, oxygen to oxygen bleaching step 24.

Line 52 from oxygen plant 42 extends to a suitable hydrogen peroxide generator 54. This permits the supply of hydrogen peroxide via line 56 to hydrogen peroxide bleaching step 36. As previously mentioned, the pulp from defiberizer is subjected to a washing treatment 18. From washer 18, the black liquor is sent to an evaporator 58 for concentrating the sodium carbonate to a higher solid content. Subsequently, the liquor is forwarded to a suitable recovery furnace 60 to recover sodium hydroxide which is the main pulping chemical. Ferric oxide is conventionally added to react with the black liquor and burn in the furnace. A suitable furnace would be a direct alkali recovery system such as taught in U.S. Pat. No. 4,000,264.

The final step of the recovery of sodium hydroxide takes place with a leaching step designated by reference numeral 62 wherein sodium ferrate is treated with hot water to recover sodium hydroxide and ferric oxide. Sodium hydroxide, the main pulping chemical, is then recycled from leaching step 62 to digester 14 where any necessary sodium hydroxide make up is added. Ferric oxide recovered from leaching step 62 is recycled to furnace 60.

Referring to FIG. 2 a second embodiment of a pulping process is illustrated. This embodiment differs from that of FIG. 1 in that from defiberizer 116 the pulp is subjected to a wash and press operation 117 and a subsequent oxygen delignification as indicated by reference numeral 119. Following oxygen delignification 119, wherein magnesium and sodium hydroxide were added, a further wash and press step 121 is provided. The pulp, subsequent to washing and pressing, is then subjected to an ozone bleaching stage 123; a further wash 125; an oxygen bleach 127; and a further wash treatment 129. The benefits and advantages of the arrangement shown in FIG. 2 are similar to those of FIG. 1 with the elimination of air and water pollution, energy saving, water consumption reduction and savings in equipment construction cost. The various typical process variables are given hereinbelow.

Referring to FIG. 3 a process suitable for the pulping of hardwood is illustrated. In this process, a single stage soda-AQ delignification is carried out in digester 214. The pulp is then subjected to a screening and washing 215 and a pressing 270. Subsequently, the bleaching is similar to that of the embodiment of FIG. 2 as will be evident from the flow diagram of FIG. 3.

Table 1 hereinbelow gives typical process conditions for the pulping of softwood in a two-stage soda-AQ and hydrogen peroxide delignification. Table 2 gives the typical process conditions for pulping of hardwood with a two-stage soda-AQ and oxygen delignification such as shown in FIG. 2. It will be understood that the process conditions given therein are for purposes of illustration only and that variations of the operating conditions could be made depending on factors well known to those skilled in the art.

TABLE 1

2-Stage Soda-AQ and Hydrogen Peroxide ($H_2O_2$) Delignification

| Soda-AQ Delignification Stage | |
|---|---|
| Active alkali (NaOH) charged on O.D. wood | 20–25% |
| AQ applied on O.D. wood | 0.1–0.4% |
| Temperature | 160–170° C. |
| Cooking Time | 120–150 mins. |
| Final K No | 40–60 |
| Hydrogen Peroxide ($H_2O_2$) Delignification Stage | |
| Initial K No | 40–60 |
| $H_2O_2$ applied on O.D. pulp | 0.5–1.0% |
| NaOH applied on O.D. pulp | 3–4% |
| Pulp consistency | 15–25% |
| Reaction time | 60–90 mins. |
| Final K No | 20–30 |

Note: Process Conditions Exemplified by Pulping of Softwood

TABLE 2

2-Stage Soda-AQ and Oxygen Delignification

| Soda AQ-Delignification Stage | |
|---|---|
| Active alkali (NaOH) charged on O.D. wood | 13–15% |
| AQ applied on O.D. wood | 0.01–0.05% |
| Temperature | 160–170° C. |
| Cooking Time | 60–100 mins |
| Final K No | 40–50 |
| Oxygen Delignification Stage | |
| Initial K No | 40–50 |
| Oxygen pressure | 10–11 $Kgf/cm^2$ |
| Oxygen applied | ½–2% |
| Consistency | 20–25% |
| Temperature | 110–130° C. |
| Alkali charged on O.D. pulp as NaOH | 3–7% |

TABLE 2-continued

2-Stage Soda-AQ and Oxygen Delignification

| Reaction Time | 25–35 mins. |
|---|---|
| Final K No | 15–25 |

Note: Process Conditions exemplified by pulping of hardwood

Table 3 hereinbelow sets forth process conditions for various bleaching stages as might be utilized in the embodiments of FIGS. 1, 2 and 3. Table 4 sets forth process conditions for a direct alkali recovery system such as recover furnace 60 in FIG. 1, while Table 5 gives typical process conditions for a single stage soda-AQ delignification.

TABLE 3

Bleaching Process Conditions for Various Bleaching Stages

| | Oxygen Stage | Ozone Stage | NaOH Extraction Stage | Hydrogen Peroxide Stage |
|---|---|---|---|---|
| Pulp Consistency | 2–30% | 1–40% | 1–15% | 10–25% |
| Oxygen ($O_2$) applied on O.D. pulp | 0.2–3% | | | |
| Temperature | 80–120° C. | 15–60° C. | 20–60° C. | 20–90° C. |
| PH | 9–12 | 2–7 | 6–8 | 7–11 |
| Time | 10–60 mins | 5–30 mins | 70–90 mins | 10–300 mins |
| Magnesium Salt ($Mg^{+2}$) applied at high consistency | 0.1–0.3% | | | |
| Ozone ($O_3$) applied on O.D. pulp | | 0.2–1% | | |
| NaOH applied on O.D. pulp | 3–7% | | 1–3% | — |
| Hydrogen Peroxide applied on O.D. pulp | | | | 0.2–2% |

TABLE 4

Process Conditions of DARS Process

| Ferric oxide make up | 10–30 Kg/dat pulp |
|---|---|
| Black liquor concentration before burning | 40% |
| Combustion temperature of mixture ($Na_2CO_3 + Fe_2O_3$) in furnace | 800° C. |
| Combustion Time | 180 mins |
| Hot water temperature for dissolved smelt products | 90° C. |
| Time for dissolving smelt | 20 mins |
| Efficiency if caustification | 85–94% |
| Amount of $Fe_2O_3$ applies $\frac{\text{Mole Equiv } Fe_2O_3}{\text{Mole Equiv NaOH}}$ | 2:1 |
| Recovered NaOH at leaching process | 150–200 gpl |

TABLE 5

Single Stage Soda-AQ Delignification

| Active alkali (NaOH) charged on O.D. wood | 15–17% |
|---|---|
| AQ applied on O.D. wood | 0.05–0.4% |
| Temperature | 160–170° C. |
| Cooking time | 20–100 mins |
| Final K No | 10–20 |

Note: Process Conditions exemplified by pulping of hardwood

It will be understood that the above-described embodiments are for purposes of illustration only and that changes and modifications may be made thereto without departing from the spirit and scope of the invention.

I claim:

1. A process for pulping lignocellulosic material comprising the steps of:
   (a) subjecting the lignocellulosic material to a digestion stage in the presence of NaOH as active alkali compound charged at between 20 to 25% and anthraquinone charged at between 0.1 to 0.4% at a temperature of between 160° C. to 170° C. for a time period of between 120 to 150 minutes to have a final K number of 40 to 60.
   (b) defiberizing the said pulp from step (a);
   (c) washing the defiberized pulp from step (b) and sending black liquor removed by the washing to an evaporator;
   (d) treating the washed pulp from step (c) with between 0.5 to 1.0% of hydrogen peroxide and 3 to 4% of sodium hydroxide for a period of between 60 to 90 minutes at a pulp consistency of between 15 to 25% to give a final K number of between 20 to 30 and subsequently washing the treated pulp;
   (e) subjecting the washed pulp from step (d) to an oxygen bleaching with oxygen charged at between 0.2 to 3% with a pulp consistency of between 3 to 30% at a temperature of between 80° to 120° C. at a pH of between 9 to 12 for a time period of 10 to 60 minuted with a magnesium ion present at between 0.1 to 0.3% and NaOH present at between 3–7% and subsequently washing said pulp;
   (f) further bleaching said pulp from step (e) in the presence of ozone at between 0.2 to 1% at a pulp consistency of between 1 to 40% for a time of between 5 to 300 minutes at a temperature of between 15° to 60° C. at a pH of between 2 to 7 and subsequently washing the pulp;
   (g) subjecting said washed pulp from step (f) to a sodium hydroxide extraction with sodium hydroxide being applied at between 1 to 3%, a pulp consistency of between 1 to 15%, a temperature of between 20° to 60° C., a pH of between 6 to 8 for a time period of between 70 to 90 minuted and subsequently washing the pulp;
   (h) further bleaching said pulp from step (g) in the presence of hydrogen peroxide charged at between 0.2 to 2% at a pulp consistency of between 10 to 25% for a time period of between 10 to 300 minutes at a temperature of between 20° to 90° C. with a pH of between 7 to 11 and subsequently washing the pulp;
   (i) the effluent from the washing of the said pulp in the above said steps (h), (g), (f) and (e) is counter-currently recycled to the said washing step in (c) and subsequently sent to the evaporator;

all percentages being based on oven-dried pulp, the process being further characterized in that the black liquor from the evaporator in step (c) is forwarded to a recovery furnace to recover sodium hydroxide which is then utilized in step (a), the oxygen from the ozone bleaching in step (f) being recycled and utilized in step (e) and the process being further characterized in being free of sulphur and chlorine.

2. A process suitable for pulping lignocellulosic material comprising the steps of:
   (a) subjecting the lignocellulosic material to a digestion stage in the presence of NaOH as active alkali compund charged at between 13 to 15% and anthraquinone charged at between 0.01 to 0.05% at a temperature of between 160° C. to 170° C. for a time period of between 60 to 100 minutes to have a final K number of 40 to 50;
   (b) defiberizing the said pulp from step (a);
   (c) washing the defiberized pulp from step (b) and sending black liquor removed by the washing to an evaporator;
   (d) subjecting the washed pulp from step (c) to an oxygen delignification with oxygen being applied at between 0.5% to 2% at pressure of between 10 to 11 kg$_f$/cm$^2$ at an initial K number of between 40 to 50, a consistency of between 20 to 25% a temperature of between 110° to 130° C., an NaOH charged as active alkali of between 3 to 7%, a reaction time of between 25 to 35 minutes to have a final K number of between 15 to 25 then subsequently washing and pressing said pulp;
   (e) further bleaching said pulp from step (d) in the presence of ozone at between 0.2 to 1% at a pulp consistency of between 1 to 40% for a time of between 5 to 30 minutes at a temperature of between 15° to 60° C. at a pH of between 2 to 7 and subsequently washing the pulp;
   (f) subjecting the washed pulp from step (e) to an oxygen bleaching with oxygen charged at between 0.2 to 3% with a pulp consistency of between 3 to 30% at a temperature of between 80 to 120° C. at pH of between 9 to 12 for a time period of 10 to 60 minutes with a magnesium ion present at between 0.1 to 0.3% and NaOH present at between 3–7% and subsequently washing said pulp;
   (g) further bleaching said pulp from step (f) In the presence of hydrogen peroxide charged at between 0.2 to 2% at a pulp consistency of between 10 to 25% for a time period of between 10 to 300 minutes at a temperature of between 20° to 90° C. with a pH of between 7 to 11 and subsequently washing the pulp;
   (h) the effluent from the washing of said pulp in the above said steps (g), (f), (e) and (d) is counter-currently recycled to the said washing step in (c) and subsequently sent to the evaporation; all percentages being based on oven-dried pulp, the process being characterized in being completely free of sulphur and chlorine, the black liquor from the evaporator in step (c) being forwarded to a recovery furnace to recover sodium hydroxide which is then utilized in step (a).

3. A process suitable for pulping hardwood material comprising the steps of:
   (a) Subjecting the lignocellulosic material to a digestion stage in the presence of NaOH as active alkali compound charged at between 15 to 17% and anthraquinone charged at between 0.05 to 0.4% at a temperature of between 160° C. to 170° C. for a time period of between 20 to 100 minutes to have a final K number of 10 to 20;
   (b) subjecting the said pulp from step (a) to a screening and washing, and sending black liquor removed by the washing to the evaporator;
   (c) pressing the said pulp from step (b);
   (d) further bleaching said pulp from step (b) in the presence of ozone at between 0.2 to 1% at a pulp consistency of between 1 to 40% for a time of between 5 to 300 minutes at a temperature of between 15° to 60° C. at a pH of between 2 to 7 and subsequently washing the pulp;

(e) subjecting the said washed pulp from step (c) to an oxygen bleaching with oxygen charged at between 0.2 to 3% with a pulp consistency of between 3 to 30% at a temperature of between 80° to 120° C. at a pH of between 9 to 12 for a time period of 10 to 60 minutes with a magnesium ion present at between 0.1 to 0.3% and NaOH present at between 3–7% and subsequently washing said pulp;

(f) further bleaching said pulp from step (d) in the presence of hydrogen peroxide charged at between 0.2 to 2% at a pulp consistency of between 10 to 25% for a time period of between 10 to 300 minutes at a temperature of between 20° to 90° C. with a pH of between 7 to 11 and subsequently washing the pulp;

(g) the effluent from the washing of the said pulp in the above said steps (f), (e) and (d) is counter-currently recycled to the said screening and washing step in (b) and subsequently sent to the evaporator;

all the percentages being based on oven-dried pulp, the process being characterized in that the process is free of chlorine and sulphur compounds and the black liquor from the washing in step (b) is forwarded to a recovery furnace to recover sodium hydroxide which is then utilized in step (a).

* * * * *